United States Patent
Feltch et al.

(10) Patent No.: US 6,725,750 B1
(45) Date of Patent: Apr. 27, 2004

(54) TURRET EXTENDER

(76) Inventors: Dave C. Feltch, 24690 Paseo De Toronto, Yorba Linda, CA (US) 92887; Anthony F. Ingham, 3471 Camero Ave., La Verne, CA (US) 91750

( * ) Notice: Subject to any disclaimer, the term of this patent is extended or adjusted under 35 U.S.C. 154(b) by 0 days.

(21) Appl. No.: 09/936,633

(22) PCT Filed: Jun. 9, 1999

(86) PCT No.: PCT/US99/12901
§ 371 (c)(1),
(2), (4) Date: Nov. 20, 2001

(87) PCT Pub. No.: WO00/56488
PCT Pub. Date: Sep. 28, 2000

Related U.S. Application Data
(60) Provisional application No. 60/125,421, filed on Mar. 22, 1999.

(51) Int. Cl.$^7$ .................. B23B 29/00; B23B 29/24; B23B 7/04
(52) U.S. Cl. .................. 82/120; 82/121; 29/36
(58) Field of Search .................. 82/120, 121; 29/39, 29/40, 41, 42, 43, 44, 45, 46, 47, 36; 74/813 R, 813 L

(56) References Cited

U.S. PATENT DOCUMENTS

| | | | | |
|---|---|---|---|---|
| 3,955,257 A | * | 5/1976 | Herbst et al. ............... 29/36 |
| 4,164,880 A | * | 8/1979 | Di Marco .................. 82/158 |
| 5,054,176 A | * | 10/1991 | Wachter ..................... 29/40 |
| 5,239,901 A | * | 8/1993 | Lin .......................... 82/119 |
| 5,341,551 A | * | 8/1994 | Brown et al. ................ 29/40 |
| 5,392,501 A | * | 2/1995 | Sonnek .................... 29/27 C |
| 5,417,131 A | * | 5/1995 | Robertson ................ 82/158 |
| 5,921,159 A | * | 7/1999 | Watkins ................... 82/159 |
| 5,974,643 A | * | 11/1999 | Hays et al. ................. 29/39 |
| 6,003,415 A | * | 12/1999 | Turner et al. ............. 82/159 |

* cited by examiner

Primary Examiner—A. L. Wellington
Assistant Examiner—Brian D. Walsh
(74) Attorney, Agent, or Firm—Christie, Parker & Hale, LLP

(57) ABSTRACT

A method and apparatus for adapting a turret extender to Computer Numeric Controlled (CNC) lathes, equipped with a main turret which is indexable about an indexing axis is disclosed. The disclosed turret extender mounts directly to the Original Equipment Manufacturer's (OEM) turret to extend the maximum turning diameter of the lathe by augmenting the original tool mounting configuration. The turret extender can accommodate, individually or in combination one or more standard tools, one or more modular tools and one or more relocated tools either standard or modular. By attaching to an OEM turret, the turret extender utilizes the original indexing electronics and hydraulics of the OEM main turret. The turret extender therefore provides enhanced machining capability in a cost efficient manner.

29 Claims, 11 Drawing Sheets

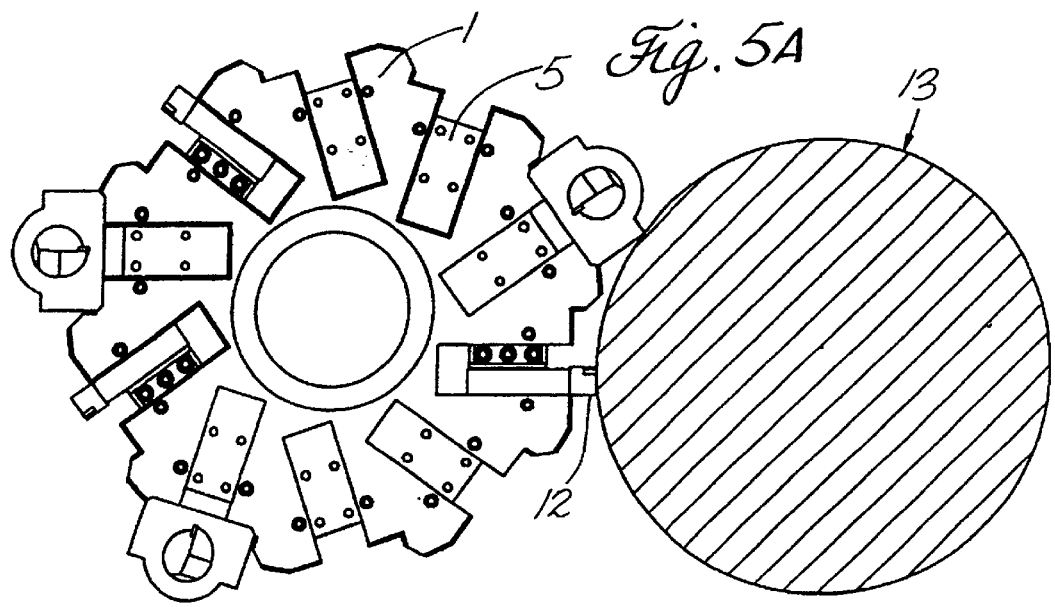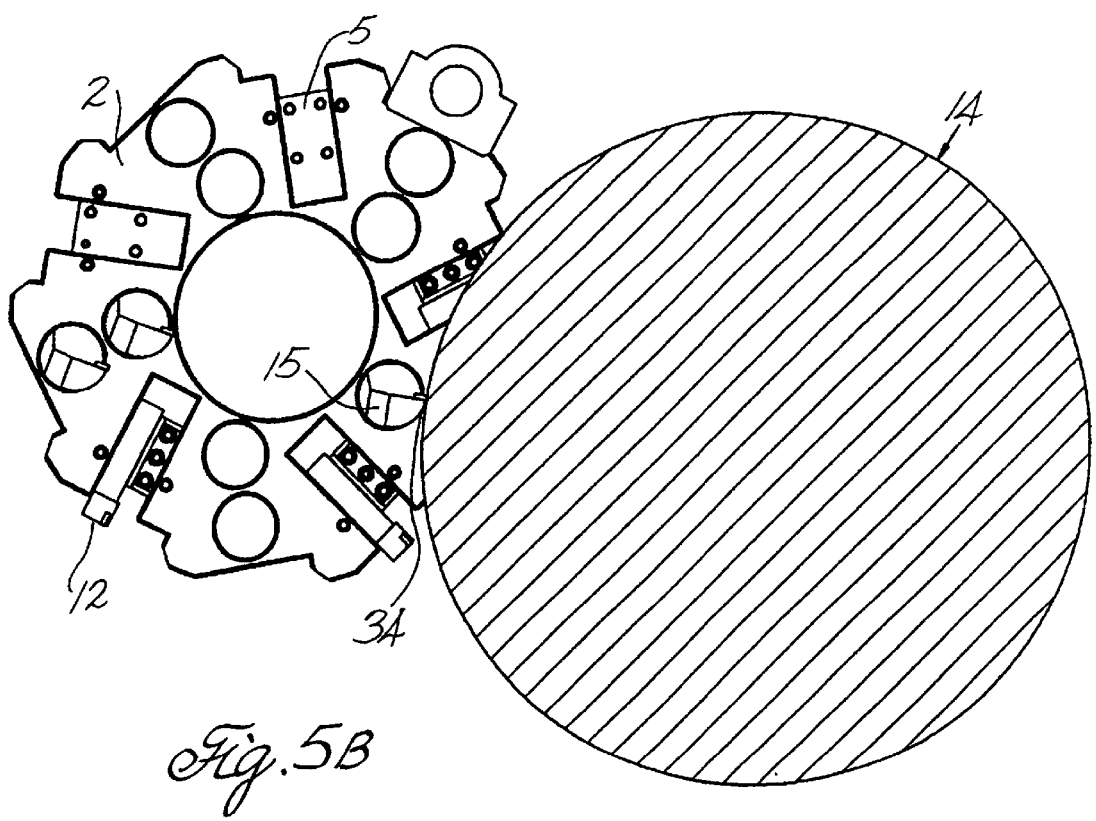

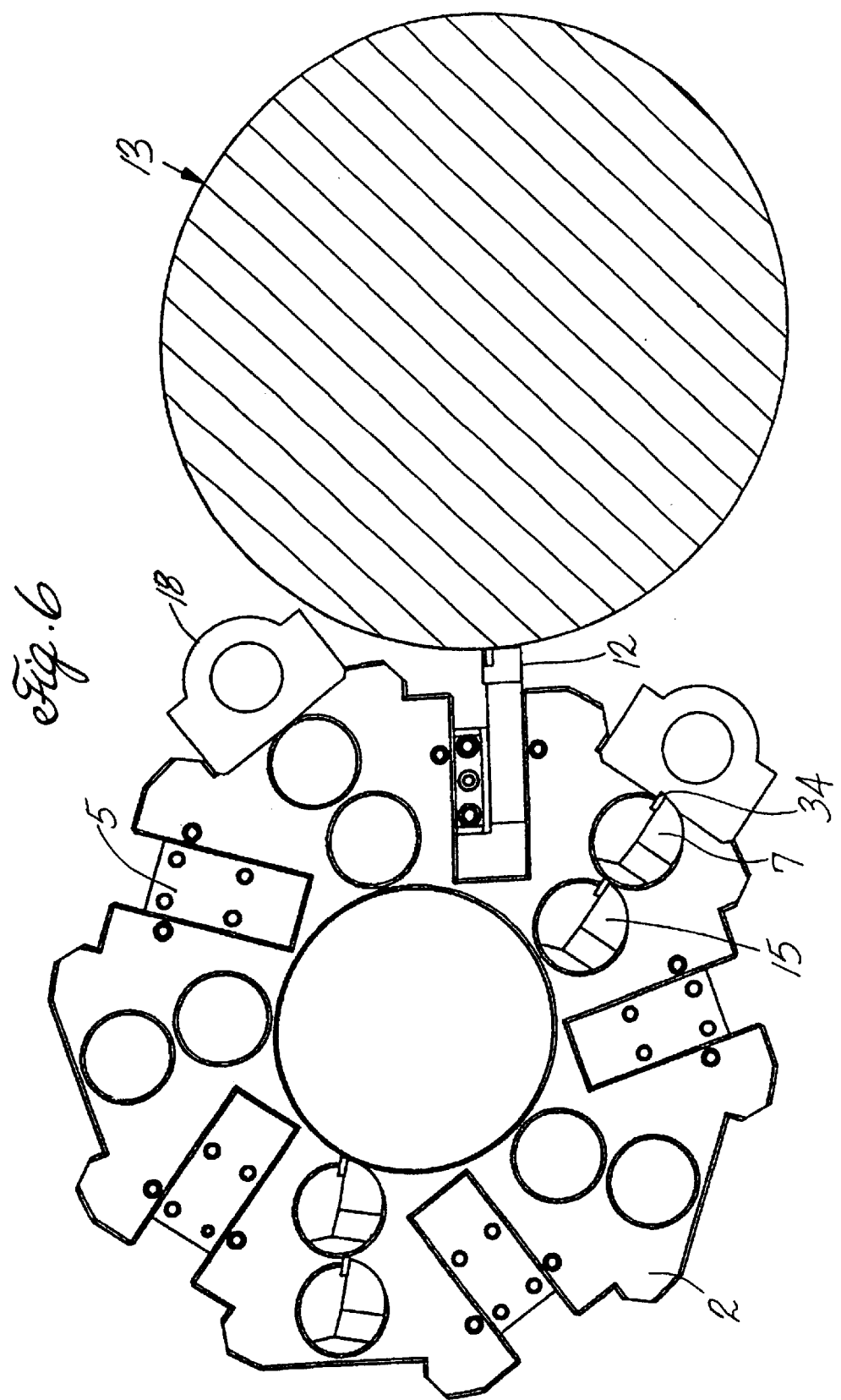

TURRET EXTENDER

CROSS-REFERENCE TO RELATED APPLICATION

This application claims priority of Provisional Application No. 60/125,421 filed on Mar. 22, 1999.

BACKGROUND OF THE INVENTION

Various mechanical operations for machining a large number of workpieces involve the use, in succession, of several tools in a programmed and automatically controlled sequence. Machine lathes are designed with special features which adapt them for large volume, production work. Any number of identical parts can be reproduced accurately and rapidly on these machines. For this purpose, the workpiece is usually mounted on a lathe or similar machining center which is provided with an auxiliary apparatus. Examples of auxiliary apparatus which are used in conjunction with lathes include multi sided, indexing tool holders or turrets, which are designed to hold several tools, the machine becoming a turret lathe. Typically, the cutting tools are arranged radially and/or frontally on a rotating plate. The controlled rotation of the rotating plate brings the preselected tool into the working position for carrying out the required machining of the workpiece.

A turret is incorporated into a machine lathe to obtain increased part production through the progressive performance of different machining operations without removing the workpiece from its support, and without changing the tooling setup. In modern automatic turret lathes the turret is fitted with multiple machine tools consisting of standard tooling in combination with modular and/or relocated tooling. The cutting tools attached to each face of the turret by respective tool holders are successively brought into contact with the workpiece by rotating or indexing the turret When properly adjusted, the cutting tool setup need not be altered throughout the machining of a given part, allowing for the rapid machining of any quantity of similar parts with the initial tool setup.

However, the setting and adjustment of the cutting tools used on high volume production machines are tasks requiring great skill and, in most cases, considerable time. The tool holders pertaining thereto are relatively complicated and it is relatively difficult to obtain a satisfactory cutting position for each of the different tools. Therefore, for modularity and ease of use on a variety of machining operations, the majority of automatic turret lathes are configured with turrets having standard tool capability only. To upgrade the capability of the lathe for modular tool use requires the purchase of an additional independent turret and disassembly and reassembly of the indexing electronic and hydraulic components internal to the machine. In most instances, it is cost prohibitive to purchase an alternate turret for more modular machine operation. Additional costs are incurred due to the relatively lengthy, complicated changeover required to disassemble, reassemble and calibrate the indexing mechanisms of the alternate turret at each change over.

SUMMARY OF THE INVENTION

There is therefore provided according to a preferred embodiment of the present invention, a turret extender as an accessory for Computer Numeric Controlled (CNC) lathes, equipped with a main turret which is indexable about an indexing axis. Referring to FIG. 3, the turret extender 2 housing can support individually or in combination, one or more standard cutting tools, one or more boring bars, or one or more modular tools, in standard or relocated locations. The turret extender 2 mounts to and moves in unison with the existing Original Equipment Manufacturer's (OEM) turret 1. Thus, the turret extender 2 utilizes the original indexing electronics and hydraulics of the OEM main turret 1, avoiding the relatively lengthy, complicated changeover required to disassemble, reassemble and calibrate the indexing mechanisms of alternate turrets. In addition, installation of turret extender 2 is further simplified by the fact that each turret extender 2 is customized to adapt to a particular OEM turret 1. In most instances the turret extender 2 can be adapted to mount to an OEM turret 1 using existing tooling mounts without the need to modify OEM turret 1.

DESCRIPTION OF THE DRAWINGS

These and other features of the present invention will be better understood by reading the following detailed description in conjunction with the accompanying drawings, wherein:

FIG. 5(a) is a front view of a stock (OEM) turret demonstrating standard machining capability.

FIG. 5(b) is a front view of a representative turret extender with enhanced machining capability.

FIG. 6 is a front view which demonstrates the extender adapted to mount the OEM tool holders.

DETAILED DESCRIPTION OF THE INVENTION

Figure 1:
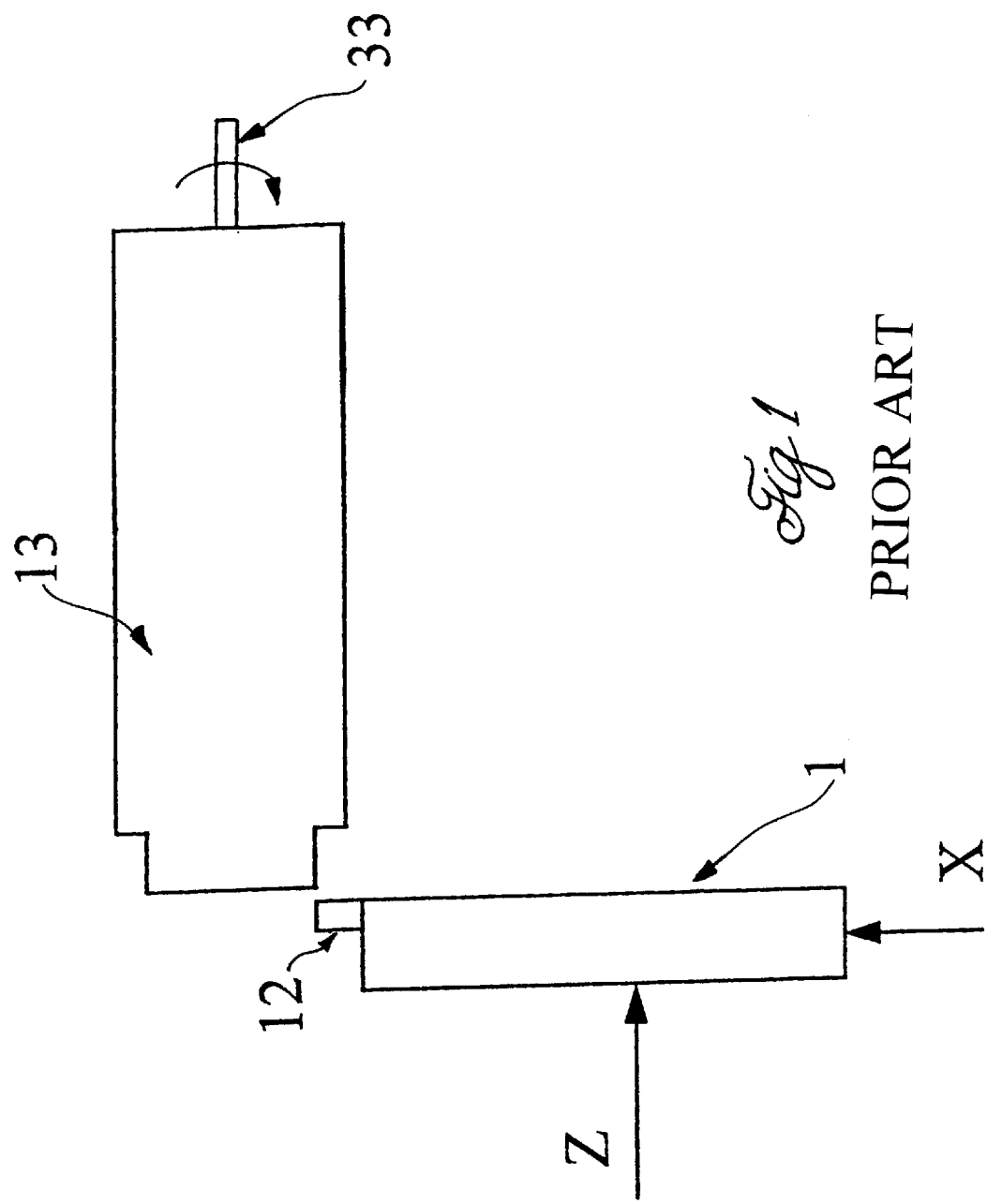
FIG. 1 is a schematic top view of a conventional OEM horizontal turret, slant bed lathe.

As shown in FIG. 1 which is a schematic top view of part of a conventional horizontal turret, slant bed lathe, wherein one or more machine tools 12 are typically mounted on an OEM turret 1. OEM turret 1 is designed to be attached to a carriage assembly (not shown) which in turn is attached to the bed of a lathe. Work piece 13 is secured by a chuck on a spindle assembly 33 in proximity to machine tool 12. The carriage assembly is movable along the longitudinal z-axis or axial x-axis direction of the lathe, in a known manner, to properly position machine tool 12 relative to workpiece 13. Typically, OEM turret 1 can be rotated or translated about an indexing axis to further index or position machine tool 12 relative to metallic work piece 13. After machine tool 12 is properly positioned, the axial position of OEM turret 1 is locked, but OEM turret 1 can be translated toward and away from workpiece 13. During operation of the machine lathe, OEM turret 1 is translated along the z-axis toward workpiece 13 until cutting tool 12 bears against the surface of workpiece 13. Spindle 33 driven by a motor (not shown) is used to rotate workpiece 13. As machine tool 12 removes material from workpiece 13, OEM turret 1, is translated toward workpiece 13 so machine tool 12 continues to bear against the surface of workpiece 13.

As shown in FIG. 1 which is a schematic top view of part of a conventional horizontal turret, slant bed lathe, wherein one or more machine tools 12 are typically mounted on an OEM turret 1. OEM turret 1 is designed to be attached to a carriage assembly (not shown) which in turn is attached to the bed of a lathe. Work piece 13 is secured by a chuck on a spindle assembly 33 in proximity to machine tool 12. The carriage assembly is movable along the longitudinal z-axis or axial x-axis direction of the lathe, in a known manner, to properly position machine tool 12 relative to workpiece 13. Typically, OEM turret 1 can be rotated or translated about an indexing axis to further index or position machine tool 12 relative to metallic work piece 13 After machine tool 12 is properly positioned, the axial position of OEM turret 1 is locked, but OEM turret 1 can be translated toward and away from workpiece 13. During operation of the machine lathe, OEM turret 1 is translated along the z-axis toward workpiece 13 until cutting tool 10 bears against the surface of workpiece 13. Spindle 33 driven by a motor (not shown) is used to rotate workpiece 13. As machine tool 12 removes material from workpiece 13, OEM turret 1, is translated toward workpiece 13 so machine tool 12 continues to bear against the surface of workpiece 13.

Figure 2:
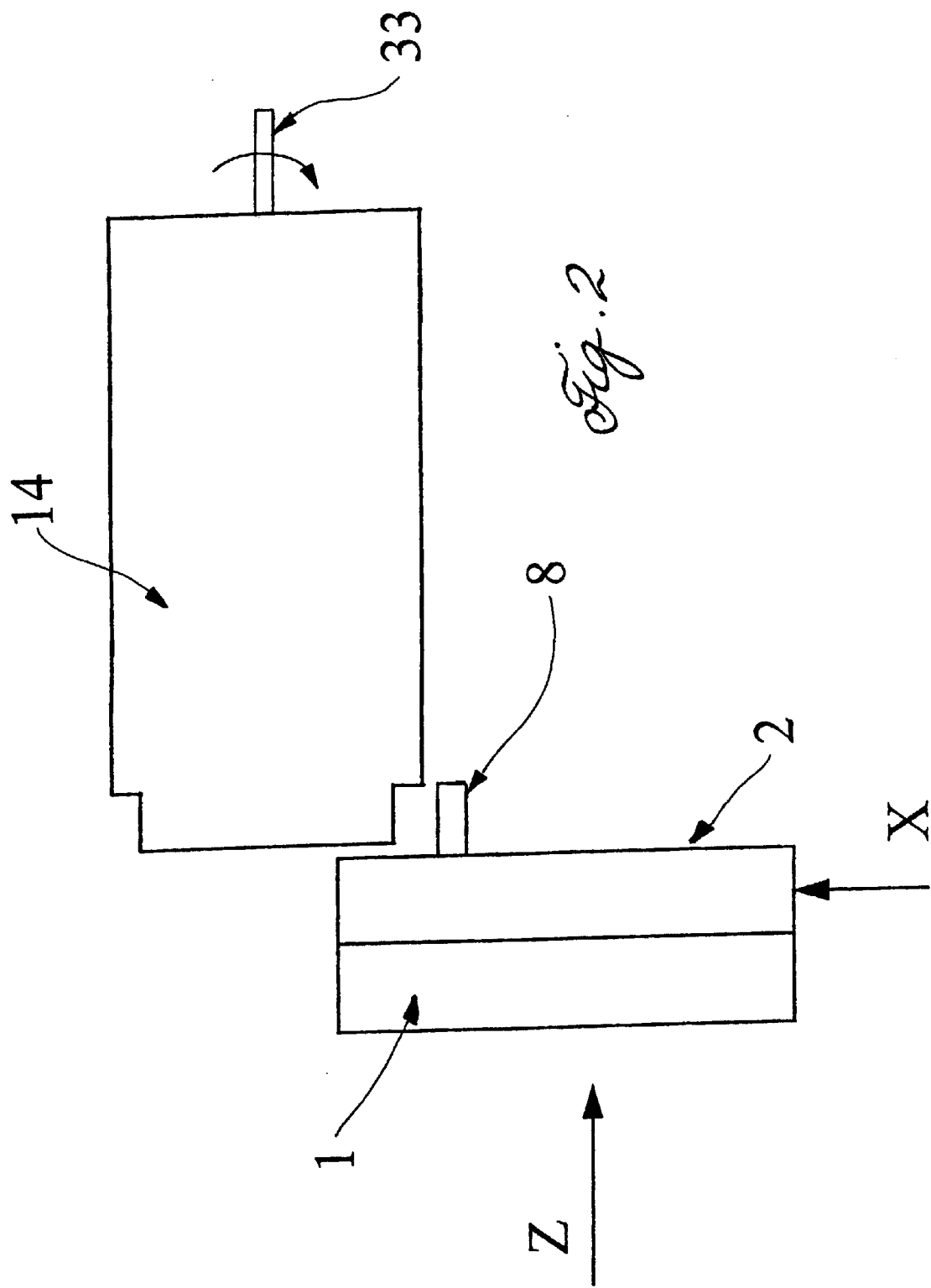
FIG. 2 is a schematic top view of a conventional horizontal turret slant bed lathe with a turret extender coupled to the OEM turret.

According to the present invention, a turret extender 2 is bolted onto OEM turret 1 as illustrated in FIG. 2. Turret extender 2 consists of a modular housing with socket like recesses and or fixtures to mount tools at any number of different positions relative to a workpiece 14. Through the use of turret extender 2, it is possible for the machine tool lathe to perform machining operations which are not possible with OEM turret 1, due to the limited fixed locations of tools.

Figure 3:
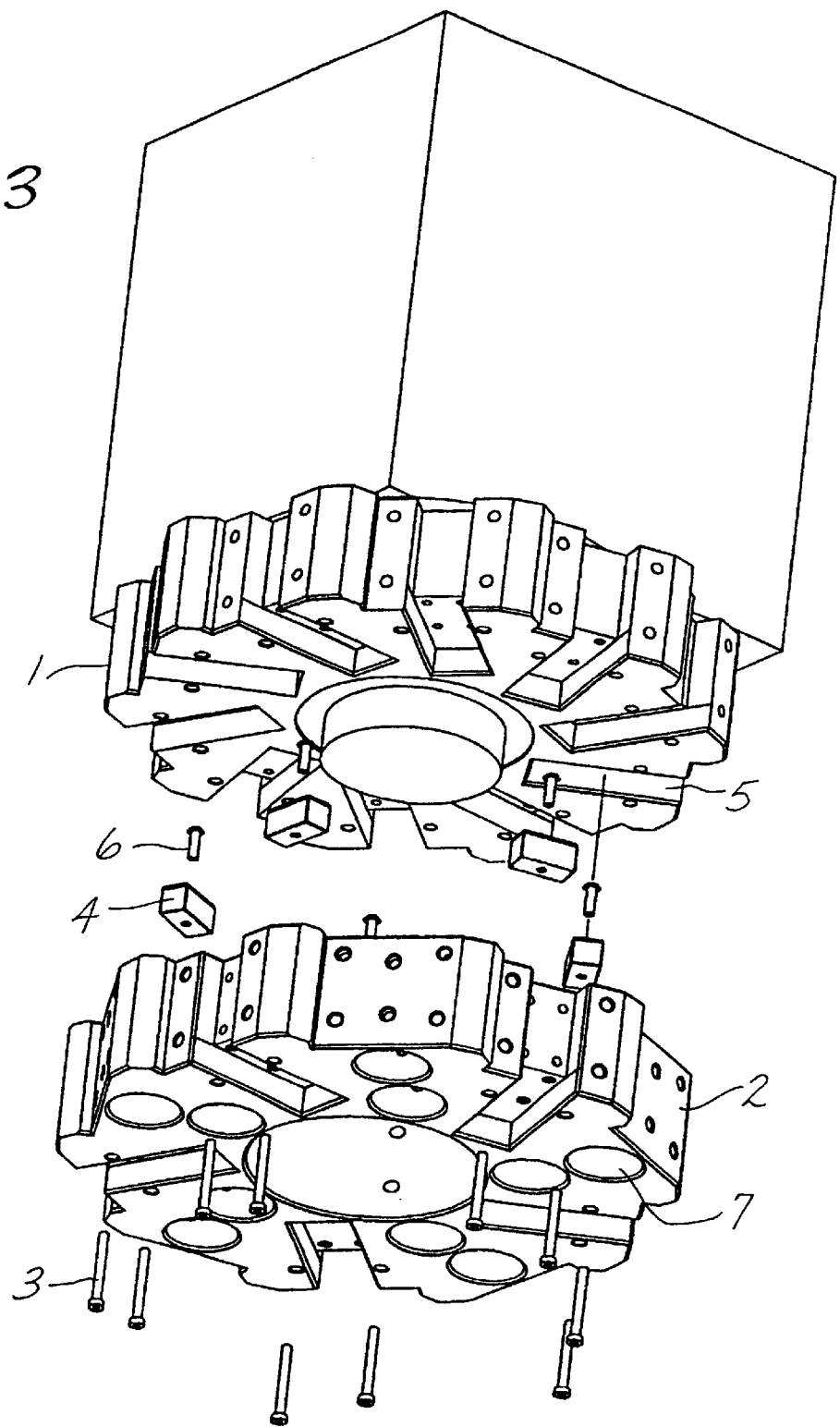
FIG. 3 is an exploded view of a representative turret extender adapted to mount to an OEM turret.
Figure 10:
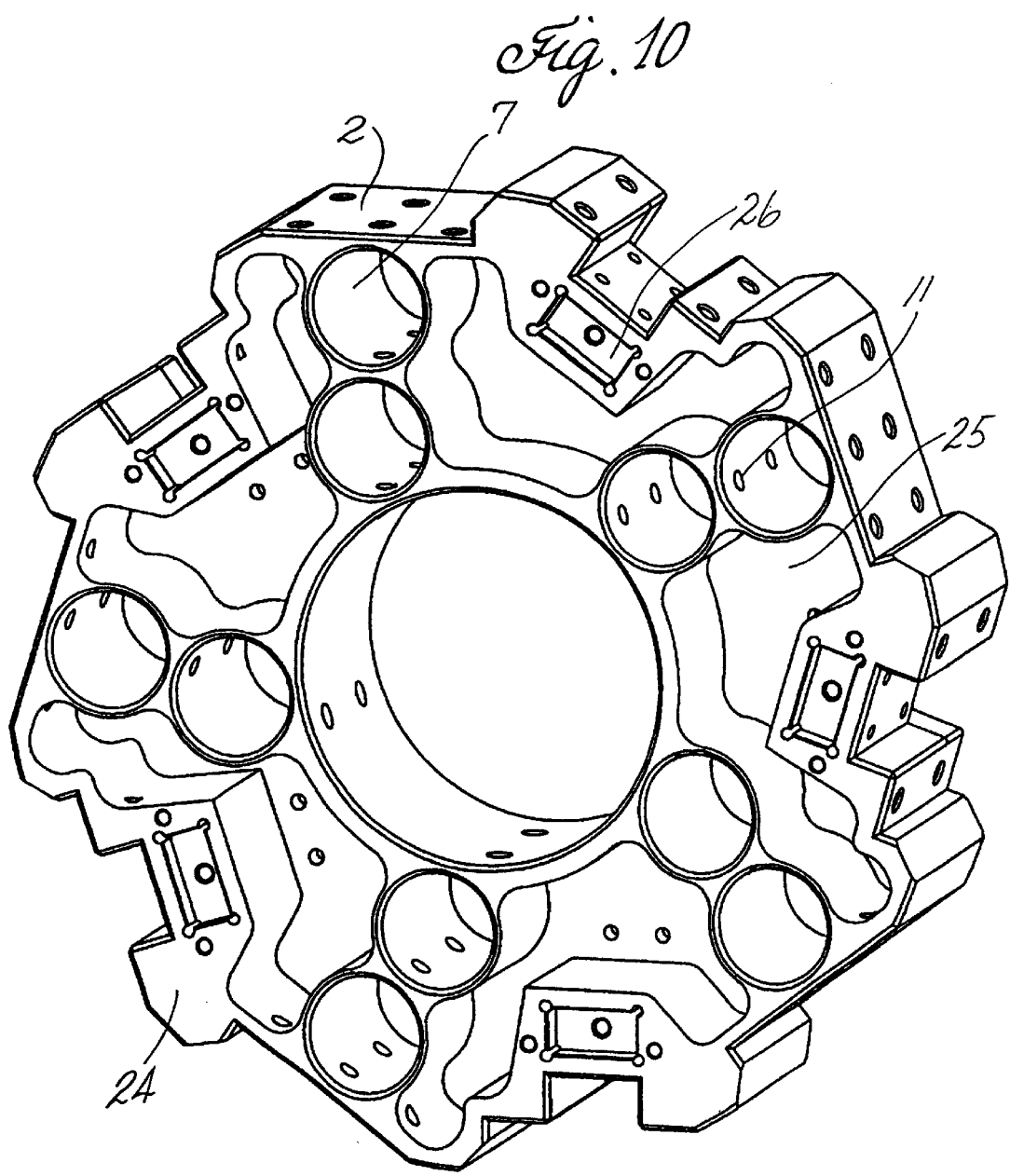
FIG. 10 is a perspective view of the rear face (i.e., the face that mounts on the OEM turret) of the turret extender.

FIG. 3 is an exploded view of a representative turret extender 2 adapted for use with a particular OEM turret 1, the MORI SEIKI™ VL-35 TURRET. When attached, turret extender 2 moves in unison with OEM turret 1. Turret extender 2 can typically be mounted in approximately 10 minutes. Mounting is accomplished with ten front face bolts 3 and five locating key blocks 4. Locating key blocks 4 absorb the radial forces applied to turret extender 2 during the actual turning operation and locate OEM turret 1 and turret extender 2 in relation to each other. In the preferred embodiment of the present invention, locating key blocks 4 operatively engage existing slot like, machine tool mounting recesses 5 on OEM turret 1. For this embodiment, locating key blocks 4 are bolted 6 into recesses 26 on a rear face 24, (i.e. the face that mounts on OEM turret 1) of turret extender 2 as shown in FIG. 10. Alternate embodiments of the present invention are not limited to the mounting technique shown in FIG. 3. Turret extender 2 can be located relative to OEM turret 1 with alignment pins or plates and can be readily mounted with set screws, clamps, pins or other techniques known to those skilled in the art. Similarly, alternative structural members for absorbing the radial forces exert on turret extender 2 during machine operation could include plates, pins, set screws or other techniques known to those skilled in the art.

Figure 4:
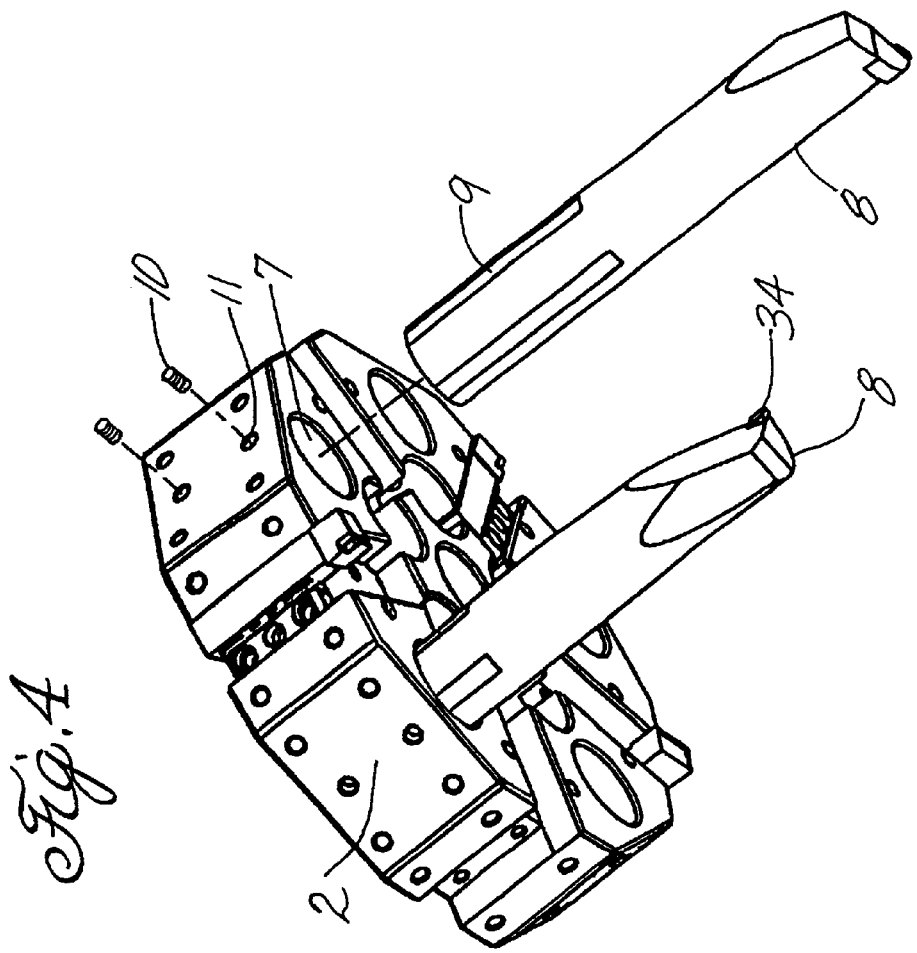
FIG. 4 is a perspective demonstrating the integration of machine tools in relocated positions on the turret extender.

Referring to the perspective view of FIG. 4 turret extender 2 includes a plurality of integrally formed tool holders 7 that allow one or more machine tools 8 to be installed in relocated positions. Tool holders 7 are modular in that machine tools 8 may be installed with a cutting element 34 facing inboard, positive X direction, as shown in FIG. 4, to perform conventional boring operations or outboard, negative X direction, for use as a turning tool. The relocated tool holders 7 are socket like cylindrical recesses adapted to operatively receive the cylindrical shaft of machine tools 8. In the preferred embodiment of the present invention, machine tools 8 are secured in relocated positions by bolts 10 inserted from a side 11 into a clamping flat 9 on the shaft of machine tool 8. Alternatively, set screws, locking pins, or other attachment devices known to those skilled in the art could be used to couple machine tools 8 to turret extender 2.

Automatic slant bed lathes are equipped with conventional operating components, such as a spindle assembly, an X slide axis assembly, an indexable cutting tool turret, and a Z slide axis assembly. Various tools—stationary tools for the lathe machining and rotating tools for boring, milling and the like—are generally arranged on the tool turret. With known automatic lathes of the type described, half of the travel path of a tool which is available for machining extends in the direction of the X-axis located on each side of the cutting plane so that a work piece can be machined off-center with respect to the cutting plane in both directions with an equal maximum distance.

The largest workpiece diameter that can be machined is limited by the maximum distance the cutting tool can be offset along the X-axis from the workpiece axis of rotation. Turret extender 2 includes a plurality of relocated stationary and rotating tool holders 7. Relocated tool holders 7, extend the X-axis offset of the cutting tool, allowing the lathe to machine larger than stock diameter parts. FIGS. 5A & 5B are front view drawings comparing the operation of a stock (OEM) turret 1 and turret extender 2 respectively. OEM turret 1 is shown with standard cutting tool 12 capability. For this representative OEM turret 1 the largest workpiece 13 that can be turned is 18 inches in diameter. Turret extender 2, utilizing a representative relocated tool holder location 15, with cutting element 34 of the tool facing outboard toward the center of the workpiece when cutting, allows a workpiece 14 with a larger diameter to be turned.

The largest workpiece diameter that can be machined is limited by the maximum distance the cutting tool can be offset along the X-axis from the workpiece axis of rotation. Turret extender 2 includes a plurality of relocated stationary and rotating tool holders 7. Relocated tool holders 7, extend the X-axis offset of the cutting tool, allowing the lathe to machine larger than stock diameter parts. FIGS. 5(*a*) & (*b*) are front view drawings comparing the operation of a stock (OEM) turret 1 and turret extender 2 respectively. OEM turret 1 is shown with standard cutting tool 12 capability. For this representative OEM turret 1 the largest workpiece 13 that can be turned is 18 inches in diameter. Turret extender 2, utilizing a representative relocated tool holder location 15, with cutting element 34 of the tool facing outboard toward the center of the workpiece when cutting, allows a workpiece 14 with a larger diameter to be turned.

Alternate embodiments of the present invention are not limited to relocated tool holder locations 15 shown in FIG. 5B. Turret extender 2 may be customized to embody alternate tool holder locations 15 which are optimized for a given turning operation. Thus, for a given turning operation, turret extender 2 can be designed and fabricated so as to provide minimal tool interference while optimizing the cutting position of multiple tools. This simplifies the NC programing required for a given turning operation and minimizes the actual time on machine to fabricate a given part.

Alternate embodiments of the present invention are not limited to relocated tool holder locations 15 shown in FIG. 5. Turret extender 2 may be customized to embody alternate tool holder locations 15 which are optimized for a given turning operation. Thus, for a given turning operation, turret extender 2 can be designed and fabricated so as to provide minimal tool interference while optimizing the cutting position of multiple tools. This simplifies the NC programing required for a given turning operation and minimizes the actual time on machine to fabricate a given part.

Figure 7:
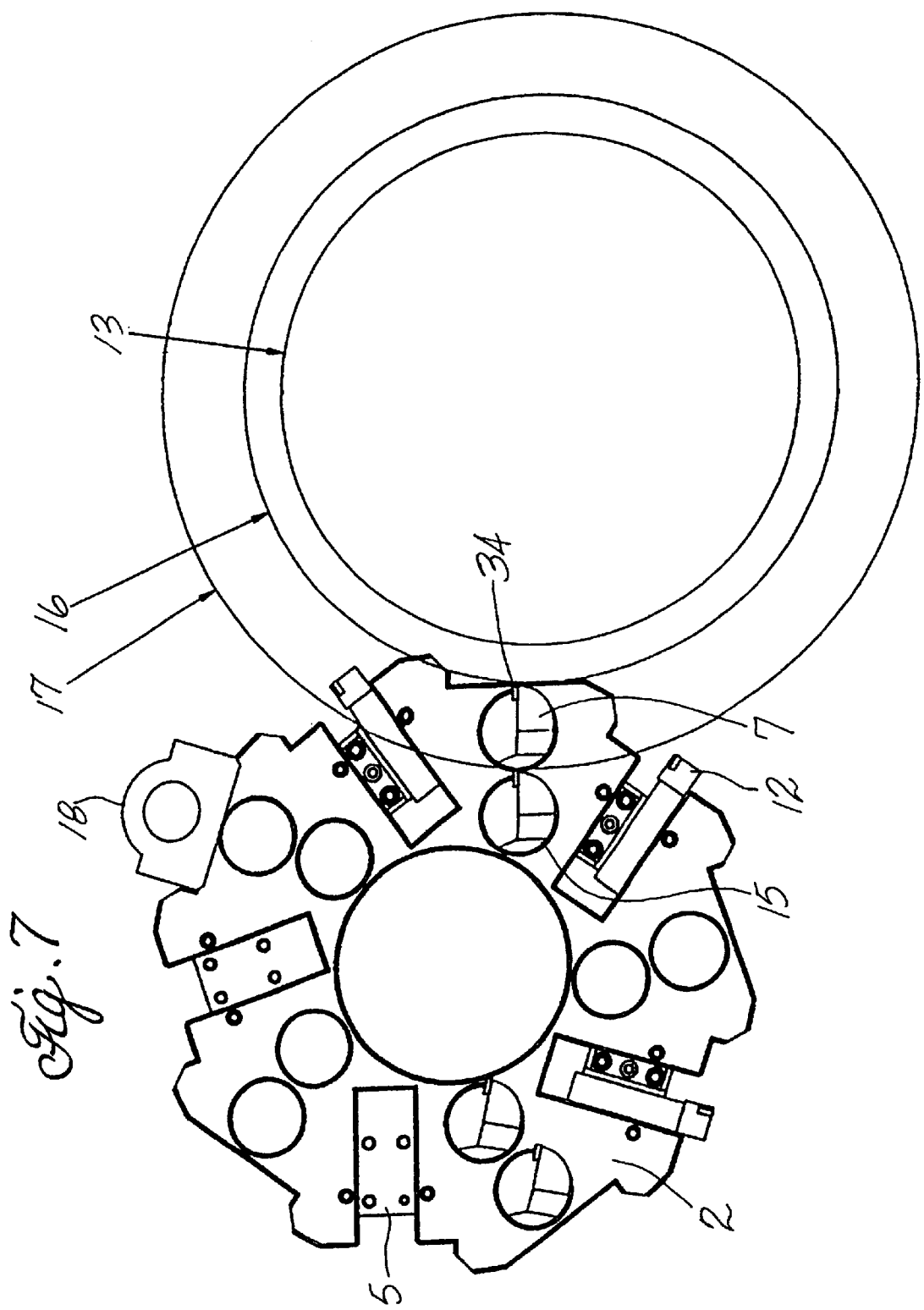
FIG. 7 is a front view which demonstrates the use of a modified tooling location, inboard of the OEM tool location, on the turret extender.
Figure 8:
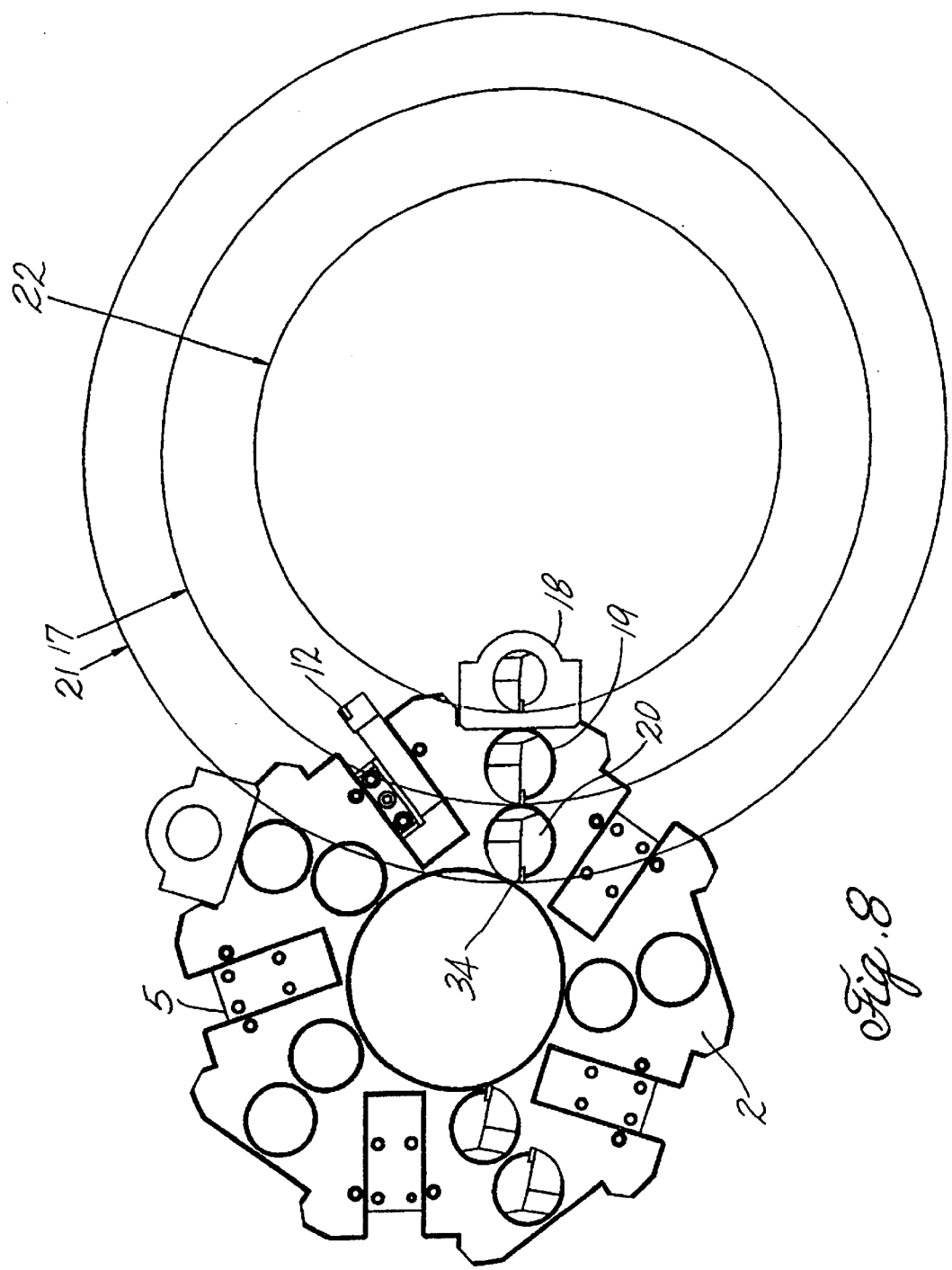
FIG. 8 is a front view which demonstrates the use of a non standard large diameter boring bar along with modified inboard tooling locations.

FIGS. 6, 7, and 8 are front view drawings which demonstrate how in operation, turret extender 2 can duplicate the machining capability provided by OEM turret 1, while also extending the maximum turning and boring diameter capability of a machine lathe beyond that provided by OEM turret 1. A consistent turret extender 2—workpiece relation, wherein turret extender 2 has been translated to the extreme of its X-Axis travel, is shown. Thus, each figure depicts the maximum diameter part that can be turned for a given tool installation. FIG. 6 demonstrates turret extender 2 adapted to mount OEM standard cutting tool 12. Turret extender 2 positions standard cutting tool 12 or boring tool 18 in the same position as OEM turret 1. This allows for the continued, uninterrupted production of existing parts without the requirement to modify the CNC program or dismount turret extender 2. However, the maximum diameter workpiece 13 that can be turned with turret extender 2 configured to mount standard tools 12 or boring bars 18 in locations which match OEM turret 1, is limited to that achieved by OEM turret 1 (in this case 18 inches).

Conventionally, when turning larger than stock diameter workpieces, a boring bar is used as a turning tool. Boring bars are typically used for removal of internally disposed material, creating a void or bore (i.e. an internal cylindrical surface) inside a lathe turned form. The rigidity of the boring bar limits the maximum workpiece diameter that can be turned Turret extender 2 can be adapted to accommodate increased diameter boring bars with increased rigidity as required when turning large diameter parts. FIG. 7 demonstrates the operation of turret extender 2 with boring bars installed in relocated tool holders 7, 15. The use of boring bars installed inboard of OEM standard cutting tool 12 allows the user to extend the X-axis range of the CNC lathe. Therefore, significantly larger workpieces 16, 17 can be machined without extending the X-axis travel. In this example, the largest workpiece 17 that can be turned using relocated tool holder location 15, with cutting element 34 facing outboard, towards the center of workpiece 17 when cutting, is approximately twenty-six inches in diameter. This is an increase of approximately eight inches over stock diameter workpiece 13.

FIG. 8 demonstrates the use of a larger diameter boring bar 18 installed in relocated tool holders 19, 20, in a conventional orientation for boring, such that cutting element 34 of the tool faces the perimeter of workpiece 21 when cutting. The maximum workpiece boring diameter 17, 21 is now extended beyond the stock workpiece 22 limit.

Figure 9:
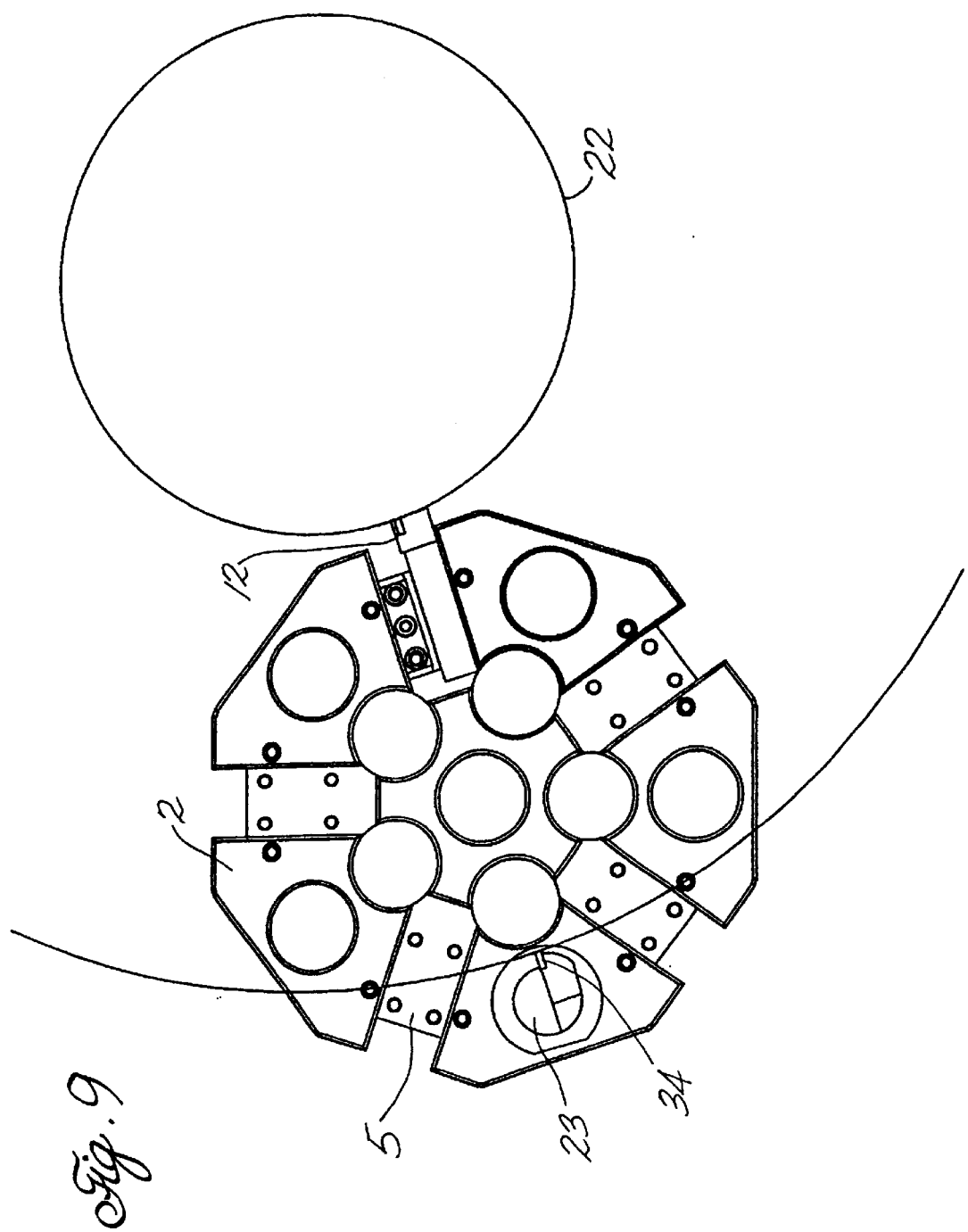
FIG. 9 is a front view demonstrating the use of tooling locations on the outboard side of the turret extender.

The maximum turning or boring diameter can be further increased through the use of boring bars installed in relocated tool holders 23 on the outboard side of turret extender 2. FIG. 9 is a front view demonstrating the use of a boring bar installed in relocated tool holder 23 on the outboard side of turret extender 2. In this example the machine tool is installed with cutting element 34 facing the center of the workpiece when in the cutting position for use as a turning tool. For this machine tool installation, the maximum diameter workpiece that can be turned is increased to approximately 41 inches. A similar increase in boring diameter is attainable when the machine tool is installed such that cutting element 34 is oriented for boring. In this way the maximum turning or boring diameter is extended to workpiece diameters that can be contained within the sheet metal enclosure/bed of the lathe.

The preferred embodiment of the present invention is manufactured from low carbon steel. Turret extender 2 is machined using any of a number of conventional milling techniques known in the art The invention is not limited to any one turret configuration. The housing shape of turret extender 2 can be readily designed and machined to match all shapes and sizes of OEM turrets 1. A perspective view of a rear face 24, (i.e. the face that mounts on OEM turret 1) of the preferred embodiment is shown in FIG. 10. Recesses or hollows 25 are milled into rear face 24 of the preferred embodiment of turret extender 2 to reduce the actual solid volume of turret extender 2 housing and thus it's weight. This embodiment minimizes the loads placed on bolts 3 (FIG. 3) used to mount turret extender 2 as well as the loads placed on the carriage assembly used to position OEM turret 1 and turret extender 2 relative to a workpiece.

Selection of a particular machine tool for a particular application depends upon numerous factors; such as the production anticipated and the size and complexity of the product. The present invention gives the machine operator added versatility. In alternate embodiments of the present invention, the machine operator can specifically adapt turret extender 2 to accommodate any one of multiple turret configurations without having to replace OEM turret 1. For example, the setting and adjustment of the cutting tools used on production machines are tasks requiring high skill and, in most cases, considerable time. In response to the deficiencies in standard tooling turrets, modular tooling or quick change tooling turrets, (such as the KENNEMETAL KM™ QUICK CHANGE TURRET) have been developed to reduce the changeover and setup time required for a tooling change. In an alternate embodiment of the present invention, turret extender 2 can be specifically adapted to accommodate modular quick change tool holders rather then standard tool holders.

Figure 11:
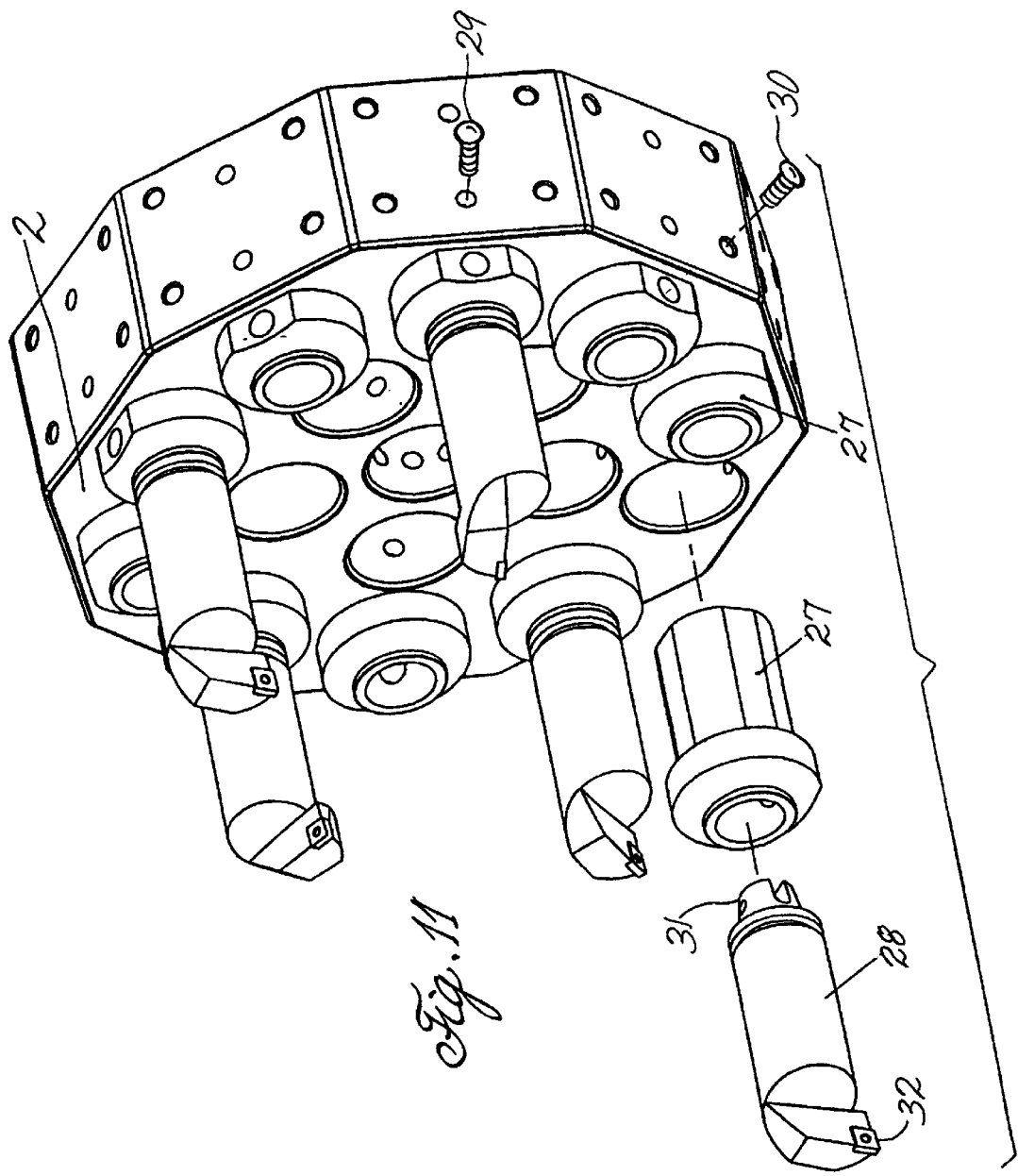
FIG. 11 is a perspective view of the turret extender adapted to accommodate specialized quick change tooling.

FIG. 11 is a perspective view of turret extender 2 adapted to accommodate modular (quick change) tooling adapters 27 and modular (quick change) boring bars 28. Modular tooling adapters 27 are secured by set screws 29, inserted from the side as shown in FIG. 9. Modular boring bars 28 are inserted into modular tooling adapters 27 and secured with a set screw 30 through modular tool adapter 27 into a bottom flange 31 of modular boring bar 28. Modular boring bars 28 can again be installed with a cutting element 32 oriented so as to operate as a boring or turning tool. This alternate embodiment of the present invention thus provides the capability of a modular, quick change, tooling turret without the excessive cost and set-up time required for the purchase and installation of an additional OEM turret 1. In an alternate embodiment, modular tooling adapters 27 are integrally formed into turret extender 2 eliminating the requirement to purchase and install separate modular tooling adapters 27. Alternate embodiments of the present invention are not limited to modular quick change tooling turrets. Further alternate embodiments of the present invention can be adapted to incorporate other speciality tool holders known to those skilled in the art Although a preferred embodiment of the present invention has been described, it should not be construed to limit the scope of the invention. Those skilled in the art will understand that various modifications may be made to the described embodiment. Turret extender 2 housings may be designed and adapted to all CNC lathes equipped with a main turret 1 which is indexable about an indexing axis. Moreover, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention.

What is claimed is:

1. A turret adapter for automatic lathes equipped with a main turret which is indexable about an indexing axis, the main turret having a plurality of standard tool locations relative to a workpiece, the turret adapter comprising:
   a modular housing, for supporting individually or in combination, one or more standard cutting tools, one or more boring bars, or one or more modular tools, in the standard tool locations around circumference of the modular housing and relocated tool locations within the circumference of the modular housing to increase diameter of the workpiece that can be machined by the lathe, said housing being coupled to and movable together with said main turret.

2. The turret adapter of claim 1 wherein the modular housing further comprises one or more socket like recesses within said housing, said recesses being adapted to operatively engage one or more boring bars.

3. The turret adapter of claim 1 wherein the modular housing further comprises one or more slot like recesses on said housing, said recesses being adapted to operatively engage one or more standard cutting tools.

4. The turret adapter of claim 1 wherein the modular housing further comprises one or more socket like recesses within said housing, said recesses being adapted to operatively engage one or more modular tooling adapters.

5. The turret adapter of claim 4 wherein said modular tool adapters are quick change tooling adapters.

6. The turret adapter of claim 1 wherein the modular housing further comprises one or more integrally formed modular tooling adapters.

7. The turret adapter of claim 6 wherein said integrally formed modular tool adapters are quick change tooling adapters.

8. The turret adapter of claim 1 wherein the modular housing further comprises voids or pocket like hollows on a rear side of said housing that mounts to said main turret so as to reduce the weight of said housing.

9. The turret adapter of claim 1 further comprising an alignment member for locating said turret adapter with said main turret.

10. The turret adapter of claim 1 further comprising a structural member for absorbing the radial forces exerted on said turret extender during actual turning operations.

11. The turret adapter of claim 10 wherein the structural member for absorbing said radial forces further comprises:
    locating key blocks coupled to said turret adapter; and
    recesses in said main turret which operatively engage the locating key blocks.

12. A turret adapter for automatic lathes equipped with a main turret which is indexable about an indexing axis, the main turret having a plurality of stock tool locations relative to a workpiece, the turret adapter comprising:
    a housing;
    means for operatively coupling said housing to said main turret, so that said housing is movable with respect to the lathe together with said main turret; and
    means for operatively coupling one or more machine tools, in relocated tooling locations within circumference of said housing to increase diameter of the workpiece that can be machined.

13. The turret adapter of claim 12 wherein the means for coupling said housing to said main turret further comprises:
    means for locating said housing in relation to said main turret.

14. The turret adapter of claim 12 wherein the means for coupling said housing to said main turret further comprises:
    means for absorbing the radial forces exerted on said housing during the actual turning operation.

15. The turret adapter of claim 14 wherein the means for absorbing said radial forces further comprises:
    locating key blocks coupled to said housing; and
    recesses in said main turret which operatively engage the locating key blocks.

16. The turret adapter of claim 12 wherein the means for operatively coupling one or more machine tools, in stock or relocated tooling locations to said housing further comprises:
    means for operatively coupling one or more machine tools to said housing so as to duplicate the tooling locations provided by said main turret.

17. The turret adapter of claim 12 wherein the means for operatively coupling one or more machine tools, in stock or relocated tooling locations to said housing further comprises:
    means for operatively coupling one or more standard cutting tools to said housing.

18. The turret adapter of claim 12 wherein the means for operatively coupling one or more machine tools, in stock or relocated tooling locations to said housing further comprises:
    means for operatively coupling individually or in combination one or more standard cutting tools, or one or more boring bars in stock or relocated positions to said housing.

19. The turret adapter of claim 12 wherein the means for operatively coupling one or more machine tools, in stock or relocated tooling locations to said housing further comprises:
    means for operatively coupling one or more boring bars in stock or relocated tooling locations to said housing.

20. A method for increasing the maximum turning diameter of an automatic lathe equipped with a main turret which is indexable about an indexing axis, said method comprising the steps of:
    operatively coupling one or more machine tools to a housing in relocated tool positions within circumference of the housing to increase diameter of workpiece that can be machined by the lathe;
    operatively coupling said housing to said main turret so that said housing is movable, with respect to the workpiece, in unison with said main turret;
    securing one end of an increased diameter workpiece in a chuck or collet of a lathe;
    rotating said chuck or collet and said workpiece while;
    contacting said workpiece with at least one machine tool in a relocated tooling position.

21. A method for increasing the maximum boring diameter of an automatic lathe equipped with a main turret which is indexable about an indexing axis, said method comprising the steps of:
    operatively coupling one or more boring bars to a housing in relocated tool positions within circumference of the housing to increase diameter of workpiece that can be machined by the lathe;

operatively coupling said housing to said main turret so that said housing is movable with respect to the workpiece in unison with said main turret;

securing one end of an increased diameter workpiece in a chuck or collet of a lathe;

rotating said chuck or collet and said workpiece while;

contacting said workpiece with at least one boring bar in a relocated tool position.

22. A machine tool system comprising:

a lathe;

a chuck for securing one end of a workpiece;

a spindle for rotating the chuck and a workpiece about a central axis;

a main turret having a plurality of standard tool locations relative to a workpiece, the main turret being indexable about an indexing axis; and a modular housing, for supporting individually or in combination, one or more standard cutting tools, one or more boring bars, or one or more modular tools, in the standard tool locations around circumference of the modular housing and relocated tool locations within the circumference of the modular housing to increase diameter of the workpiece that can be machined by the lathe, said housing being coupled to and movable together with said main turret.

23. The machine tool system of claim 22 wherein the modular housing further comprises one or more socket like recesses within said housing, said recesses being adapted to operatively engage the shaft of one or more machine tools.

24. The machine tool system of claim 22 wherein the modular housing further comprises one or more slot like recesses on said housing, said recesses being adapted to operatively engage one or more standard cutting tools.

25. The machine tool system of claim 22 wherein the modular housing further comprises one or more socket like recesses within said housing, said recesses being adapted to operatively engage one or more modular tooling adapters.

26. The machine tool system of claim 25 wherein said modular tooling adapters are quick change tooling adapters.

27. The machine tool system of claim 22 wherein the modular housing further comprises one or more integrally formed modular tooling adapters.

28. The machine tool system of claim 27 wherein said integrally formed modular tool adapters are quick change tooling adapters.

29. The machine tool system of claim 22 wherein the modular housing further comprises voids or pocket like hollows on a rear side of said housing that mounts to said main turret so as to reduce the weight of said housing.

* * * * *